H. A. MEARS.
STOVE PIPE DAMPER.

No. 184,255.  Patented Nov. 14, 1876.

Attest.
E. J. Behel.
L. E. Glenny.

Inventor
Horace A. Mears.
Per Jacob Behel
Atty.

UNITED STATES PATENT OFFICE.

HORACE A. MEARS, OF ROCKFORD, ILLINOIS.

IMPROVEMENT IN STOVE-PIPE DAMPERS.

Specification forming part of Letters Patent No. 184,255, dated November 14, 1876; application filed April 13, 1876.

*To all whom it may concern:*

Be it known that I, HORACE A. MEARS, of the city of Rockford and State of Illinois, have invented new and useful Improvements in Stove-Pipe Dampers, which improvements are fully set forth in the following specification, reference being had to the accompanying drawings.

The object of my invention is to provide a reliable stove-pipe damper of cheap construction, that can be readily applied, and when in place the parts will be locked in position, and that will stand in any position when adjusted, for the purpose of controlling the draft, and also to provide a handle of non-conducting material of such construction that it will remain comparatively cool in the heated stove, so as to be readily operated with the fingers, without other appliances. To this end I have devised and constructed the damper represented in the accompanying drawings, in which—

Figure 1:
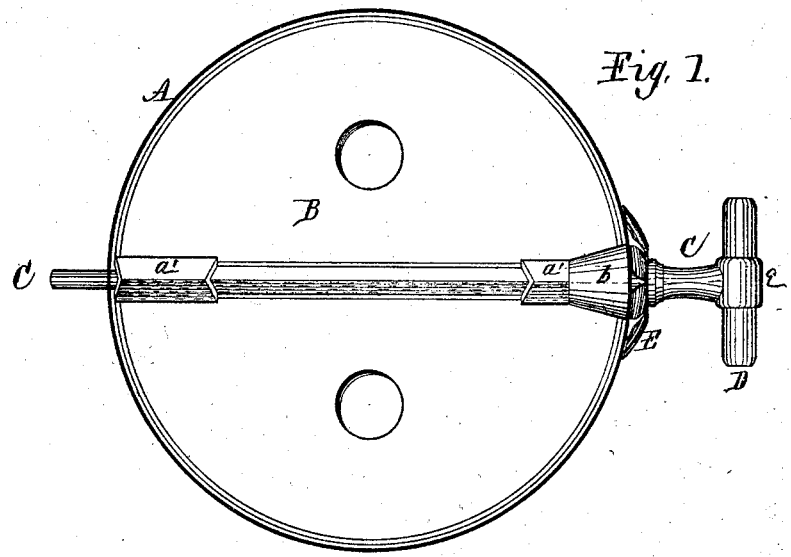
Figure 2:
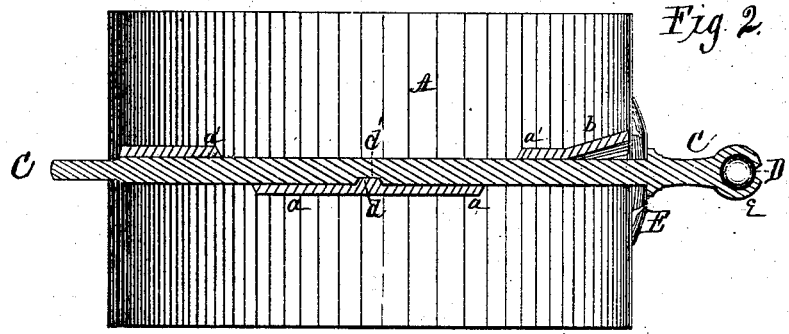
Figure 3:
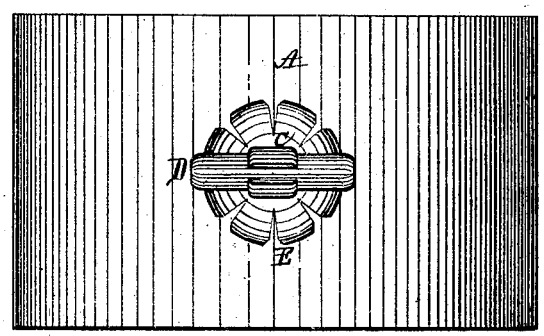

Figure 1 is a plan view of my improved stove-pipe damper in place in the pipe. Fig. 2 is a vertical central sectional view, and Fig. 3 is an elevation of a portion of a stove-pipe, showing the handle end of the damper.

In the drawings, A represents a portion of a stove-pipe made in the usual manner, and of material commonly employed in the manufacture of such goods, and is provided with suitable holes on opposite sides, for the reception of a shaft to support a damper in place in the pipe. B is a damper of disk form of plate or cast material, having its axis fitted with a square opening, the transverse section of which is diagonal to the plane of the disk, and is formed of three sections, $a$ and $a'$, which rise in V form from different portions of the opposite sides of the disk in such a manner that the V-formed raised portions are alternately on opposite sides, and at one end, on one side of the disk, is provided with a conic-formed enlargement, (shown at $b$,) and is also fitted centrally in the inner angle of the opening with a prominence, as represented at $d$. C is a square shaft fitted to the square opening in the disk, and is formed with rounded journals at each edge of the disk to enter the holes in the pipe which forms the bearings in which the damper rests. One of the angles of the shaft is notched, as at $d'$, to receive the prominence $d$ in the disk, which serves to hold the disk B and shaft C relatively in position in the pipe, and to permit of being readily inserted or removed from the pipe, the spring of the material being sufficient for the purpose.

E is a rosette-spring formed of plate material, radially slotted, and raised in such a manner that the outer ends of the radial arms formed by the radial slots will rest against the outer surface of the pipe. The center of this spring is provided with a hole for the reception of the shaft C, which is provided with a collar to rest against the spring.

The object of this part of my invention is to hold the damper in any adjusted position for the purpose of controlling the draft by lessening the capacity of the pipe. This is accomplished by means of the spring-action of the rosette-spring forcing the conic portion $b$ of the disk B against the inside of the pipe, and the collar of shaft C and spring E, producing friction sufficient to hold the disk in any adjusted position, the shaft being held from withdrawing from the disk by means of the prominence $d$ engaging the notches $d'$ in the shaft.

D is a handle provided for the purpose of turning the disk in different positions in the pipe, to control the draft, and may be made of any suitable material. In this instance I have employed zinc, and this I prefer on account of its non-conducting qualities and cheapness, and have constructed it in tubular form, to permit of a circulation of air through it, to assist in keeping it cool so as to be operated by the fingers without other appliances. This handle is held in the outer end of the shaft C by means of the open clasping-ring $e$, which embrace the outer surface of the handle, and hold it securely in place, and when the shaft is made of malleable material the open ring may be bent inward to firmly clasp the handle, and, if required, the open clasping-ring may be provided with internal spurs to indent the handle to hold it more securely.

I claim as my invention—

1. The rosette-spring, of plate material, constructed as described, in combination with the shaft C and disk B, operating to hold the damper in adjusted position in the pipe by frictional contact, as and for the purpose set forth.

2. The tubular handle D, in combination with the shaft C, as and for the purpose set forth.

HORACE A. MEARS.

Witnesses:
JOHN M. BUELL,
JAMES H. MANUEL.